(12) United States Patent
Henson et al.

(10) Patent No.: US 10,497,188 B2
(45) Date of Patent: Dec. 3, 2019

(54) CLUTCH PEDAL POSITION SENSOR DIAGNOSTIC

(71) Applicants: Scott E Henson, Chelsea, MI (US); Craig A Alcock, Tecumseh, MI (US); Dhaval D Shah, Rochester Hills, MI (US)

(72) Inventors: Scott E Henson, Chelsea, MI (US); Craig A Alcock, Tecumseh, MI (US); Dhaval D Shah, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 137 days.

(21) Appl. No.: 15/707,182

(22) Filed: Sep. 18, 2017

(65) Prior Publication Data

US 2019/0088043 A1    Mar. 21, 2019

(51) Int. Cl.
*G07C 5/08* (2006.01)
*F16D 48/06* (2006.01)

(52) U.S. Cl.
CPC ......... *G07C 5/0808* (2013.01); *F16D 48/06* (2013.01); *G07C 5/0841* (2013.01); *F16D 2500/306* (2013.01); *F16D 2500/30401* (2013.01); *F16D 2500/3108* (2013.01); *F16D 2500/3109* (2013.01); *F16D 2500/3144* (2013.01); *F16D 2500/31413* (2013.01); *F16D 2500/508* (2013.01); *F16D 2500/5102* (2013.01)

(58) Field of Classification Search
CPC .................. G07C 5/0808; F16D 48/06; F16D 2500/30401; F16D 2500/306; F16D 2500/3108; F16D 2500/3109; F16D 2500/31413; F16D 2500/3144; F16D 2500/508; F16D 2500/5102
See application file for complete search history.

(56) References Cited

U.S. PATENT DOCUMENTS

| 5,014,832 | A | 5/1991 | Satoh et al. |
| 5,778,329 | A * | 7/1998 | Officer .................... F16H 59/14 |
| | | | 123/564 |
| 6,424,903 | B1 | 7/2002 | Amisano et al. |
| 6,752,743 | B2 | 6/2004 | Eich et al. |
| 8,494,711 | B2 | 7/2013 | Tiwari et al. |
| 9,567,920 | B2 | 2/2017 | Ashmore et al. |
| 10,223,751 | B1 * | 3/2019 | Hutchinson ............ G06Q 40/08 |
| 2001/0025756 | A1 * | 10/2001 | Nishimura ............... F16D 48/06 |
| | | | 192/3.58 |
| 2010/0295364 | A1 * | 11/2010 | Leiber .................... B60T 8/4077 |
| | | | 303/13 |
| 2011/0049881 | A1 * | 3/2011 | Ranier ................ B60W 30/192 |
| | | | 290/31 |

(Continued)

*Primary Examiner* — Behrang Badii
*Assistant Examiner* — Daniel L Greene
(74) *Attorney, Agent, or Firm* — Ralph E Smith

(57) ABSTRACT

A system and method of diagnosing a clutch pedal position sensor of a vehicle includes determining if a speed of the vehicle speed is less than a first predetermined speed, recording a maximum clutch pedal voltage, determining if a vehicle launch event is in progress, recording a minimum clutch pedal voltage, determining a voltage difference between the maximum clutch pedal voltage and the minimum clutch pedal voltage, and declaring a clutch pedal position sensor fault based on a comparison between the voltage difference and a threshold voltage.

15 Claims, 2 Drawing Sheets

(56) References Cited

U.S. PATENT DOCUMENTS

| | | | | |
|---|---|---|---|---|
| 2011/0077830 A1* | 3/2011 | Lochocki, Jr. | ........ | B60W 10/02 |
| | | | | 701/68 |
| 2011/0166745 A1* | 7/2011 | Tiwari | .............. | B60W 50/0225 |
| | | | | 701/29.2 |
| 2011/0190979 A1* | 8/2011 | Monti | .................... | B60T 7/122 |
| | | | | 701/33.4 |
| 2013/0305081 A1* | 11/2013 | Agnihotram | ........ | G06F 11/0793 |
| | | | | 714/2 |
| 2018/0180168 A1* | 6/2018 | Peterson | ............ | F16H 61/0213 |

* cited by examiner

CLUTCH PEDAL POSITION SENSOR DIAGNOSTIC

FIELD

The present application relates generally to clutch pedal position sensors and, more particularly, to a diagnostic system for a clutch pedal position sensor.

BACKGROUND

Vehicle clutch pedals typically include position sensors to determine a position of the vehicle clutch pedal. Such position information may be used to determine when to restart a vehicle engine with automatic stop/start capabilities, or for diagnostics to determine if the clutch pedal is working properly. However, some diagnostics can register false failures when, for example, the vehicle is driven manually without the clutch pedal or when the engine is revved in neutral. While such clutch diagnostic systems work well for their intended purpose, there remains a desire for an improved clutch pedal position sensor diagnostic system.

SUMMARY

In one exemplary aspect of the invention, a method of diagnosing a clutch pedal position sensor of a vehicle is provided. The method includes, in one exemplary implementation, determining if a speed of the vehicle speed is less than a first predetermined speed, recording a maximum clutch pedal voltage, determining if a vehicle launch event is in progress, recording a minimum clutch pedal voltage, determining a voltage difference between the maximum clutch pedal voltage and the minimum clutch pedal voltage, and declaring a clutch pedal position sensor fault based on a comparison between the voltage difference and a threshold voltage.

In addition to the foregoing, the described method may include one or more of the following features: wherein determining if a launch event is in progress comprises at least one of determining if an accelerator pedal of the vehicle is pressed a predetermined minimum distance, determining if a load on an engine of the vehicle exceeds a predetermined minimum load, determining if the vehicle is traveling at a speed greater than the first predetermined speed and less than a second predetermined speed, and determining if the vehicle is accelerating at a rate greater than a predetermined acceleration rate; wherein determining if a launch event is in progress includes determining if an accelerator pedal of the vehicle is pressed a predetermined minimum distance, determining if a load on an engine of the vehicle exceeds a predetermined minimum load, determining if the vehicle is traveling at a speed greater than the first predetermined speed and less than a second predetermined speed, and determining if the vehicle is accelerating at a rate greater than a predetermined acceleration rate; declaring the clutch pedal position sensor fault when the voltage difference is less than the threshold voltage; wherein the step of determining the voltage difference is performed after the vehicle exceeds a second predetermined speed; setting a default minimum voltage and setting a default maximum voltage for the clutch pedal position sensor; and wherein the step of recording a minimum clutch pedal voltage is only performed if the vehicle launch event is in progress.

In another exemplary aspect of the invention, a method of diagnosing a clutch pedal position sensor of a vehicle is provided. The method includes, in one exemplary implementation, setting a default minimum voltage for the clutch pedal position sensor, setting a default maximum voltage for the clutch pedal position sensor, determining if a speed of the vehicle is less than a first predetermined speed, recording a maximum clutch pedal voltage if the vehicle speed is less than the first predetermined speed, determining if a vehicle launch event is in progress, recording a minimum clutch pedal voltage if the vehicle launch event is in progress, determining if a speed of the vehicle is greater than a second predetermined speed, determining a voltage difference between the maximum clutch pedal voltage and the minimum clutch pedal voltage if the vehicle speed is greater than the second predetermined speed, and declaring a clutch pedal position sensor fault based on a comparison between the voltage difference and a predetermined threshold voltage.

In another exemplary aspect of the invention, a vehicle is provided. The vehicle includes, in one exemplary implementation, a clutch pedal, a clutch pedal position sensor, and a controller having a clutch pedal position sensor diagnostic. The controller and/or diagnostic is configured to determine if a speed of the vehicle is less than a first predetermined speed, record a maximum clutch pedal voltage, determine if a vehicle launch event is in progress, record a minimum clutch pedal voltage, determine a voltage difference between the maximum clutch pedal voltage and the minimum clutch pedal voltage, and declare a clutch pedal position sensor fault based on a comparison between the voltage difference and a predetermined threshold voltage.

In addition to the foregoing, the described vehicle may include one or more of the following features: an accelerator pedal, an accelerator pedal position sensor, a vehicle speed sensor, and an engine load sensor; wherein for the step of determining if a launch event is in progress, the controller is configured to perform at least one of determine if an accelerator pedal of the vehicle is pressed a predetermined minimum distance, determine if a load on an engine of the vehicle exceeds a predetermined minimum load, determine if the vehicle is traveling at a speed greater than the first predetermined speed and less than a second predetermined speed, and determine if the vehicle is accelerating at a rate greater than a predetermined acceleration rate; wherein for the step of determining if a launch event is in progress, the controller is configured to determine if an accelerator pedal of the vehicle is pressed a predetermined minimum distance, determine if a load on an engine of the vehicle exceeds a predetermined minimum load, determine if the vehicle is traveling at a speed greater than the first predetermined speed and less than a second predetermined speed, and determine if the vehicle is accelerating at a rate greater than a predetermined acceleration rate; wherein the controller is further configured to declare the clutch pedal position sensor fault when the voltage difference is less than the predetermined threshold voltage; wherein the step of determining the voltage difference is performed after the vehicle exceeds a second predetermined speed; and wherein the controller is further configured to set a default minimum voltage and set a default maximum voltage for the clutch pedal position sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, diagnostic systems are utilized to detect proper operation of one or more clutch pedal position sensors, which are in turn utilized to detect a position of the clutch pedal between fully depressed and fully released positions. In one example, the diagnostics system compares a ratio between engine rpm and the vehicle speed, and subsequently determines which gear the vehicle is in based on the ratio. When a ratio change occurs, the diagnostics system assumes a gear change has been made. If the ratio exceeds a predetermined threshold, the diagnostics system indicates a fault or failure of the clutch pedal position sensor. However, some diagnostics systems can register false fails if the vehicle is driven without using the clutch or the engine is revved when the transmission is in neutral.

In one example implementation, to overcome such false fails, the present diagnostics system detects vehicle parameters only during a vehicle launch. In particular, the diagnostics system records voltage on the clutch pedal position sensor when a vehicle launch is detected. A max voltage is recorded at the beginning of the launch event (clutch pedal depressed) and a minimum voltage is recorded at the end the vehicle launch (clutch pedal released). If the difference between the max/min recorded voltages does not exceed a predetermined threshold, the diagnostics system determines a clutch pedal position sensor fail/malfunction.

Figure 1:
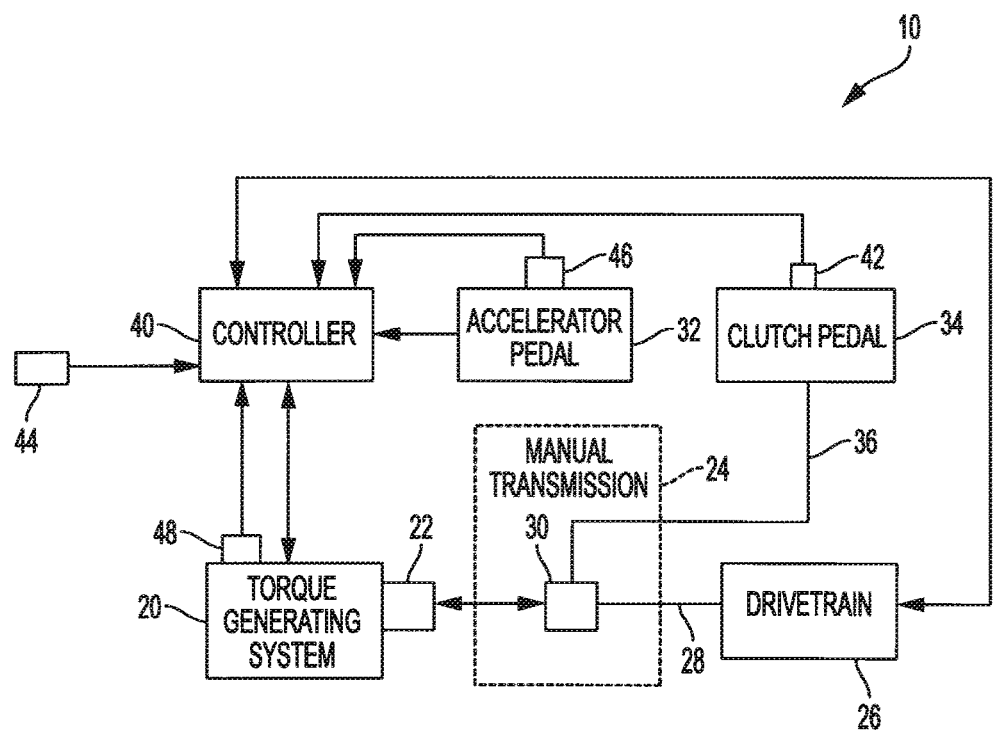
FIG. 1 is a schematic illustration of an exemplary vehicle according to the principles of the present disclosure.

Referring now to FIG. 1, an example functional block diagram of a vehicle 10 is illustrated. The vehicle 10 includes a torque generating system 20 configured to generate drive torque. Examples of the torque generating system 20 include an engine, an electric motor, and combinations thereof. The drive toque is generated by the torque generating system at a flywheel 22, and a manual transmission 24 is configured to transfer the drive torque from the flywheel 22 to a drivetrain 26. In one example implementation, flywheel 22 is coupled to a rotation shaft of the torque generating system 20 (e.g., an engine crankshaft or electric motor output shaft).

The manual transmission 24 includes an output shaft 28 coupled to the drivetrain 26 and one or more gears (not shown) for translating (e.g., multiplying) the drive torque generated at the flywheel 22 to a drive torque at the drivetrain 26. The manual transmission 24 further includes a clutch 30 coupled to the output shaft 28 and configured to fully or partially engage/disengage the flywheel 22. In one example implementation, the clutch 30 is a plate, such as a pressure plate, configured to mate with the flywheel 22, such as with a clutch disk of clutch 30 attached to the flywheel 22, when fully engaged. The configuration of the clutch 30 and the flywheel 22 allows for partial engagement/disengagement and thus clutch slip, and it will be appreciated that while a single clutch 30 is illustrated, the manual transmission 24 can include a plurality of clutches.

Vehicle 10 further includes an accelerator pedal 32, a clutch pedal 34 coupled to the clutch 30 by a mechanical linkage 36, and a controller 40. As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality. In one example embodiment, clutch 30 is electronically controlled by controller 40 (e.g., no mechanical linkage 36). In other examples, clutch pedal 32 is hydraulically actuated and includes hydraulic hoses and/or lines.

One or more clutch pedal position sensors 42 are configured to detect a position of the clutch pedal 34. In the example implementation, clutch pedal position sensor 42 includes a variable resistor that measures voltage. At a top or fully released position of the clutch pedal 34, the clutch pedal position sensor 42 detects a first voltage, and at a bottom or fully depressed position of the clutch pedal 34, the clutch pedal position sensor 42 detects a second voltage, which is higher than the first voltage. As such, in the example embodiment, the detected voltage increases as the clutch pedal 34 is moved from the fully released position to the fully depressed position. Alternatively, the detected voltage decreases as the clutch pedal 34 is moved from the fully released position to the fully depressed position. Accordingly, based on the detected voltage, controller 40 can determine the position of clutch pedal 34 between the fully released and fully depressed positions.

In the example embodiment, vehicle 10 further includes a vehicle speed sensor 44, an accelerator pedal position sensor 46, and an engine load sensor 48 each in signal communication with controller 40. The vehicle speed sensor 44 is configured to measure a speed and/or acceleration of the vehicle 10 and generate a signal indicative thereof, and the accelerator pedal position sensor 46 is configured to measure a position of accelerator pedal 32 and generate a signal indicative thereof. The engine load sensor 48 is configured to measure a load on the vehicle engine, such as when clutch 30 engages flywheel 22, and generate a signal indicative thereof. In one example, engine load sensor 48 is a manifold absolute pressure (MAP) sensor.

In one example implementation, controller 40 is configured to execute a diagnostic of the clutch pedal position sensor 42 to determine if it has failed/malfunctioned (e.g., is broken or stuck) and is not providing correct data regarding the position of clutch pedal 34. In the example implementation, controller 40 detects a fail/malfunction based on the following inputs: (1) a speed and/or acceleration of vehicle 100, (2) position signals from clutch pedal position sensor 42, (3) a position of the accelerator pedal 32, and/or (4) a load on the vehicle torque generating system 20.

Figure 2:
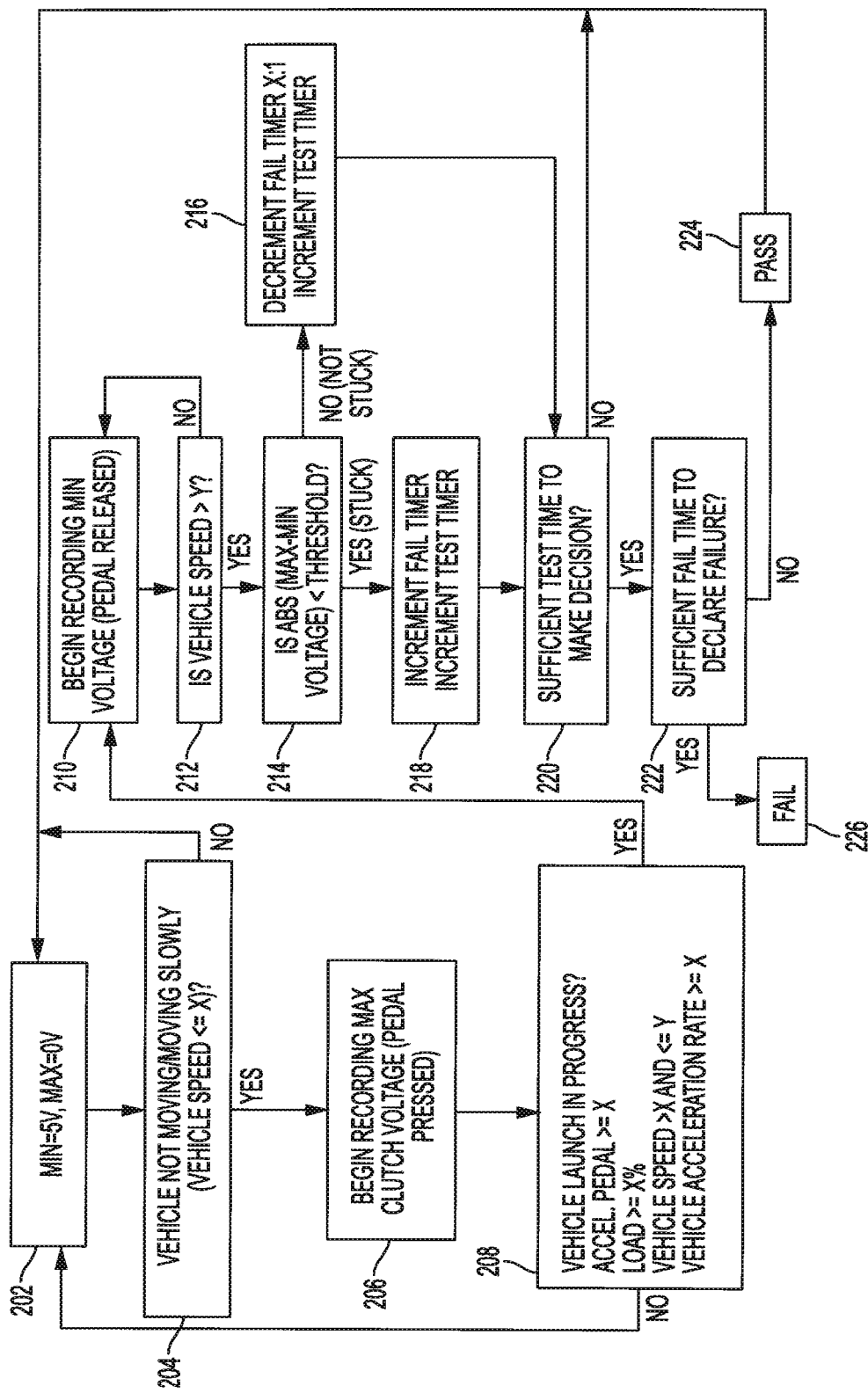
FIG. 2 is a flow control diagram illustrating an exemplary clutch pedal position sensor diagnostic method according to the principles of the present disclosure.

Referring now to FIG. 2, an example flow control diagram of a clutch pedal position sensor diagnostic method 200 is illustrated. At step 202, controller 40 clears any previously stored minimum and maximum voltage levels measured with clutch pedal position sensor 42, and sets default min and max starting voltage levels. For example, the default starting min voltage is 5V and the default starting max voltage is 0V.

At step 204, controller 40 determines if vehicle 100 is not moving or is moving slowly (i.e., below a predetermined minimum speed) based on a signal from the vehicle speed sensor 44. If no, control returns to set 202. If yes, control proceeds to step 206 and controller 40 begins monitoring and recording a maximum clutch voltage at the clutch pedal position sensor 42. Each time a new maximum voltage is detected, controller 40 stores the new maximum voltage and replaces the previously stored maximum voltage. In this way, controller 40 monitors the position of clutch pedal 34 to determine a fully pressed or substantially fully pressed position thereof. Moreover, since the vehicle is not moving (or is moving slowly) and the driver must utilize clutch pedal 34 to launch the vehicle 10, the clutch pedal position sensor diagnostic can prevent false fails due to shifting without clutch pedal 34.

At step 208, controller 40 determines if a vehicle launch event is occurring based on satisfying at least one of the following conditions: (i) the accelerator pedal position sensor 46 indicates the accelerator pedal 32 has exceeded a predetermined minimum distance; (ii) the engine load sensor 48 indicates an engine load greater than a predetermined minimum load; (iii) the vehicle speed sensor 44 indicates vehicle 10 is traveling at a speed greater than a predetermined minimum speed and/or less than a predetermined maximum speed; and (iv) the vehicle speed sensor 44 indicates vehicle 10 is accelerating at a rate greater than a predetermined minimum acceleration rate.

In the example embodiment, each of the conditions (i)-(iv) facilitates preventing the clutch pedal position sensor diagnostic from registering false fails. For example, satisfying condition (i) indicates the driver intends to accelerate the vehicle and prevents the diagnostic from continuing if the vehicle is rolling down a hill. Satisfying condition (ii) indicates the engine is under a driver initiated load and prevents the diagnostic from continuing if the vehicle is rolling down a hill. Satisfying condition (iii) indicates the vehicle is moving and prevents the diagnostic from continuing when it is likely the clutch pedal has not been substantially depressed. Satisfying condition (iv) indicates the vehicle is accelerating and prevents the diagnostic from continuing when the clutch pedal has not been substantially depressed.

If a vehicle launch is not in progress, control returns to step 202. If a vehicle launch is occurring, control proceeds to step 210 where controller 40 begins monitoring and recording a minimum clutch voltage at the clutch pedal position sensor 42. Each time a new minimum voltage is detected, controller 40 stores the new minimum voltage and replaces the previously stored minimum voltage. In this way, controller 40 monitors the position of clutch pedal 34 to determine a fully released or substantially fully released position thereof.

At step 212, controller 40 determines if a speed of vehicle 10 has exceeded the predetermined maximum speed. In the example embodiment, the predetermined maximum speed is chosen as a speed where most drivers typically switch from first to second gear. As such, this assures the diagnostic that the clutch pedal 34 has moved from the fully or substantially fully pressed position (to begin the vehicle launch) to the fully or substantially fully released position. If the vehicle 10 has not exceeded the predetermined maximum speed, control returns to step 210. If the vehicle 10 has exceeded the predetermined maximum speed (i.e., indicating the launch event has ended), control proceeds to step 214.

At step 214, controller 40 determines the absolute difference between the maximum recorded clutch voltage (step 206) and the minimum recorded clutch voltage (step 210) and compares the delta voltage to a predetermined threshold voltage. If the delta voltage is greater than the threshold voltage, the clutch pedal position sensor 42 is determined to be operating properly (e.g., it is not stuck or malfunctioning) and control proceeds to step 216 where a fail counter or timer is decremented and a test counter or timer is incremented. Control then proceeds to step 220.

If the delta voltage is less than the threshold voltage, the clutch pedal position sensor 42 is determined to not be operating properly (e.g., it is stuck) and control proceeds to step 218 where the both the fail timer and test timer are incremented. Control then proceeds to step 220.

At step 220, controller 40 determines if there has been sufficient test time for the diagnostic to make a decision if the clutch pedal position sensor 42 has a fault or has failed. In one example, sufficient test time occurs when the test timer reaches a predetermined number of increments (e.g., 3-5 increments). However, other conditions or factors may be utilized to determine when sufficient test time has occurred. If sufficient test time has not occurred, control returns to step 202.

If sufficient test time has occurred, control proceeds to step 222 where controller 40 determines if there has been sufficient fail time for the diagnostic to declare the clutch pedal position sensor 42 has a fault or has failed. In one example, sufficient fail time occurs when the fail timer reaches a predetermined number of increments (e.g., at least two increments). However, other conditions or factors may be utilized to determine when sufficient fail time has occurred. If sufficient fail time has not occurred, at step 224, the diagnostic declares a 'pass' for clutch pedal position sensor 42 and returns to step 202.

If sufficient fail time has occurred, at step 226, the diagnostic declares a 'fault' or 'fail' for clutch pedal position sensor 42. Controller 40 may then indicate the fail, for example, by emitting a sound or lighting a warning light on the vehicle instrument panel.

Described herein are systems and methods for diagnosing a clutch pedal position sensor. The method prevents a diagnostic system from registering false fails by recording maximum and minimum clutch pedal position sensor voltages only during a vehicle launch. This assures the driver is utilizing the clutch pedal and is not revving the engine while in neutral. As such, the diagnostic is not required to rely on rpm to vehicle speed ratio to diagnose the clutch pedal position sensor, which can be subject to false fails when shifting without the clutch pedal or revving the engine in neutral.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of diagnosing a clutch pedal position sensor of a vehicle, the method comprising:
receiving, at a controller, voltage signals from the clutch pedal position sensor;
determining, at the controller, if a speed of the vehicle is less than a first predetermined speed indicative of the vehicle being at rest or substantially at rest;
monitoring, at the controller, the clutch pedal voltage signals, and if the vehicle speed is less than or equal to the first predetermined speed, recording a maximum clutch pedal voltage indicative of at least substantially full depression of a clutch pedal of the vehicle;
determining if a vehicle launch event is in progress;

recording a minimum clutch pedal voltage if the vehicle launch event is in progress, the minimum clutch pedal voltage indicative of at least substantial release of the clutch pedal;

determining if a speed of the vehicle is greater than a second predetermined maximum speed greater than the first predetermined speed indicating the launch event is complete;

determining a voltage difference between the maximum clutch pedal voltage and the minimum clutch pedal voltage if the vehicle speed is greater than the second predetermined maximum speed; and declaring a clutch pedal position sensor fault based on a comparison between the voltage difference and a predetermined threshold voltage.

2. The method of claim 1, wherein determining if the vehicle launch event is in progress comprises at least one of:
determining if an accelerator pedal of the vehicle is pressed a predetermined minimum distance;
determining if a load on an engine of the vehicle exceeds a predetermined minimum load;
determining if the vehicle is traveling at a speed greater than the first predetermined speed and less than the second predetermined maximum speed; and
determining if the vehicle is accelerating at a rate greater than a predetermined acceleration rate.

3. The method of claim 1, wherein determining if a launch event is in progress comprises:
determining if an accelerator pedal of the vehicle is pressed a predetermined minimum distance;
determining if a load on an engine of the vehicle exceeds a predetermined minimum load;
determining if the vehicle is traveling at a speed greater than the first predetermined speed and less than a second predetermined speed; and
determining if the vehicle is accelerating at a rate greater than a predetermined acceleration rate.

4. The method of claim 1, further comprising declaring the clutch pedal position sensor fault when the voltage difference is less than the predetermined threshold voltage.

5. The method of claim 1, wherein the step of determining the voltage difference is only performed if the vehicle exceeds the second predetermined maximum speed.

6. The method of claim 1, further comprising setting a default minimum voltage and setting a default maximum voltage for the clutch pedal position sensor.

7. The method of claim 1, wherein the step of recording a minimum clutch pedal voltage is only performed if the vehicle launch event is in progress.

8. The method of claim 1, wherein the step of determining a voltage difference is only performed if the vehicle launch event is in progress.

9. A vehicle comprising:
a clutch pedal;
a clutch pedal position sensor; and
a controller having a clutch pedal position sensor diagnostic configured to:
determine if a speed of the vehicle is less than a first predetermined speed indicative of the vehicle being at rest or substantially at rest;
monitor, at the controller, voltage signals from the clutch pedal position sensor, and if the vehicle speed is less than or equal to the first predetermined speed, record a maximum clutch pedal voltage indicative of at least substantially full depression of the clutch pedal;
determine if a vehicle launch event is in progress;
record a minimum clutch pedal voltage if the vehicle launch event is in progress, the minimum clutch pedal voltage indicative of at least substantial release of the clutch pedal;
determine if a speed of the vehicle is greater than a second predetermined maximum speed greater than the first predetermined indicating the launch event is complete;
determine a voltage difference between the maximum clutch pedal voltage and the minimum clutch pedal voltage if the vehicle speed is greater than the second predetermined maximum speed; and
declare a clutch pedal position sensor fault based on a comparison between the voltage difference and a predetermined threshold voltage.

10. The vehicle of claim 9, wherein for the step of determining if a launch event is in progress, the controller is configured to perform at least one of:
determine if an accelerator pedal of the vehicle is pressed a predetermined minimum distance;
determine if a load on an engine of the vehicle exceeds a predetermined minimum load;
determine if the vehicle is traveling at a speed greater than the first predetermined speed and less than the second predetermined maximum speed; and
determine if the vehicle is accelerating at a rate greater than a predetermined acceleration rate.

11. The vehicle of claim 9, wherein for the step of determining if a launch event is in progress, the controller is configured to:
determine if an accelerator pedal of the vehicle is pressed a predetermined minimum distance;
determine if a load on an engine of the vehicle exceeds a predetermined minimum load;
determine if the vehicle is traveling at a speed greater than the first predetermined speed and less than a second predetermined speed; and
determine if the vehicle is accelerating at a rate greater than a predetermined acceleration rate.

12. The vehicle of claim 9, wherein the controller is further configured to declare the clutch pedal position sensor fault when the voltage difference is less than the predetermined threshold voltage.

13. The vehicle of claim 9, wherein the controller is further configured to set a default minimum voltage and set a default maximum voltage for the clutch pedal position sensor.

14. The vehicle of claim 9, wherein recording the minimum clutch pedal voltage is only performed if the vehicle launch event is in progress.

15. The vehicle of claim 9, wherein determining the voltage difference is only performed if the vehicle launch event is in progress.

* * * * *